April 8, 1952 FRITZ-ANDRÉ ROBERT-CHARRUE 2,591,876

DEAD-SECOND WATCH MECHANISM

Filed Oct. 31, 1949

Inventor:
Fritz-André Robert-Charrue
by: J. Delattre-Seguy
Attorney

Patented Apr. 8, 1952

2,591,876

UNITED STATES PATENT OFFICE 2,591,876

DEAD-SECOND WATCH MECHANISM

Fritz-André Robert-Charrue, Le Locle, Switzerland, assignor to Ebauches S. A., Neuchatel, Switzerland, a Swiss firm Application October 31, 1949, Serial No. 124,570
In Switzerland July 1, 1949

1 claim. (Cl. 58—59)

The present invention relates to a dead second mechanism, for a watch movement, comprising two co-axial wheels, one driving and the other driven forming part of the train of the second hand, these two wheels being connected by a spring and comprising the same number of teeth, and an arresting member working in conjunction with these two wheels in such a way that on the passage of each tooth of the driving wheel this member will be displaced by an amount sufficient to allow a passage for the driven wheel, which is then actuated by the spring.

This mechanism is characterized by the feature that the diameter of the driven wheel is substantially greater than that of the driving wheel, and that the arresting member is formed by a double pawl, one arm of which cooperates with the driving wheel and the other arm with the driven wheel.

The accompanying drawing shows by way of example one form of construction of the invention.

Figure 1:
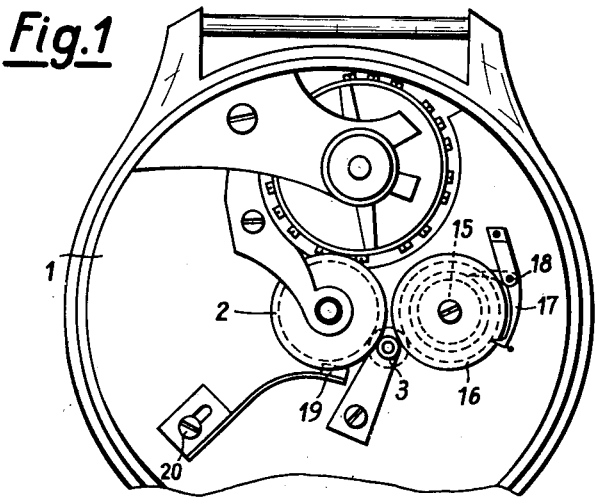
Figure 1 is a plan view of a watch provided with a mechanism according to the invention.
Figure 2:
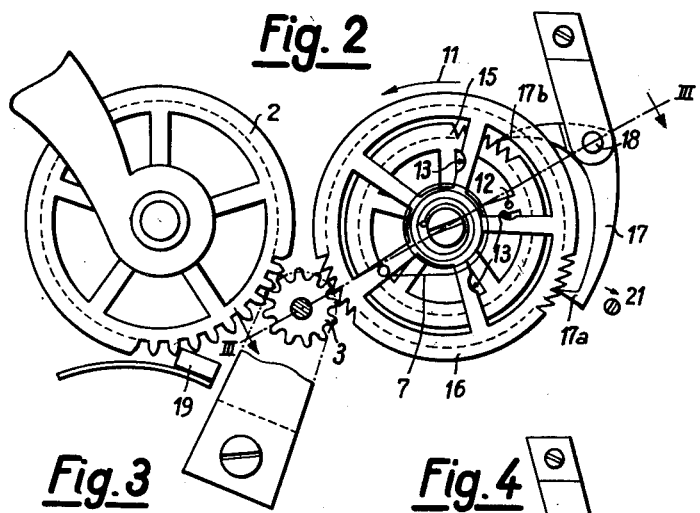
Figure 2 is a plan view of this mechanism on a large scale.
Figure 3:
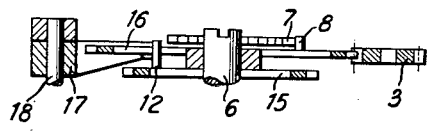
Figure 3 is a section on the plane III—III in Figure 2 looking in the direction of the arrows.
Figure 4:
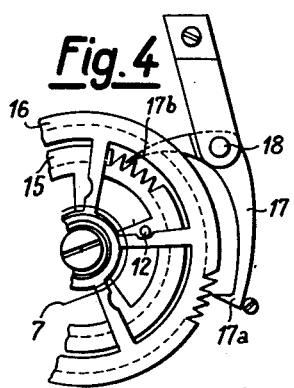
Figure 4 is partial plan view of a detail.

The watch represented is denoted by the numeral 1. Its movement comprises a wheel 2 for the seconds, driven by a pinion 3. Two co-axial wheels are mounted one on the other. The lower wheel, denoted by 15, is the driving wheel, whilst the upper one, denoted by 16, is the driven wheel. It is mounted loose on the end of the pivot 6 of the wheel 15. These two wheels are connected by means of a spiral spring 7, the inner end of which is fixed to the pivot 6, while the outer end is fixed at 8 to the wheel 16. The diameter of the wheel 16 is substantially greater than that of the wheel 15. However, they both have the same number of teeth, equal to the number of teeth of the seconds wheel 2. A double pawl 17, pivoted at 18 on the frame, co-operates with the wheels 15 and 16. In the position represented in Figure 2, an arm 17a of the double pawl 17 co-operates with a tooth of the wheel 16 and prevents the latter from turning, whilst the other arm, denoted by 17b, of the double pawl, is in contact with a tooth of the wheel 15 in the vicinity of its top part. In Figure 4, on the other hand, the end of the arm 17b is situated exactly between two teeth of the wheel 15, so that the end of the arm 17a allows the teeth of the wheel 16 to pass. On a spoke of the wheel 15 is mounted a pin 12 serving as an abutment for a spoke of the wheel 16. Certain of these latter spokes are provided with recesses 13 designed to receive the pin 12. These recesses are of different depths for different spokes, so as to make it possible to vary the relative positions of the two wheels when the spoke abuts against the pin, according to which spoke is made to co-operate with the pin. A jumper 19 works in conjunction with the wheel 2 in order to suppress any play of the seconds hand. The position of this jumper can be regulated by means of a screw 20.

The functioning of the mechanism is as follows: The wheel 15 being turned in the direction of the arrow 11 and the wheel 16 being halted by the arm 17a of the double pawl 17 (Figure 2), the spring 7 is tensioned and the pressure of the tooth of the wheel 16 on the arm 17a tends to displace the anchor according to the arrow 21. When the end of the arm 17b reaches the bottom of a tooth of the wheel 15, and only at that moment, the end of the arm 17a frees the wheel 16, which then turns under the action of the spring 7 until its spoke abuts against the pin 12. This rotation of the wheel 16 produces, through the medium of the pinion 3 and of the wheel 2, a displacement of the seconds hand corresponding to one second. The form of the teeth of the wheels 15 and 16 and that of the double pawl 17 will require to be determined in such a manner that, with the wheel 15 beating fifths of a second, the pawl 17 will liberate the wheel 16 at the end of each fourth vibration of the wheel 15, so that the wheel 16 will beat seconds.

The mechanism according to the present invention can be combined with a chronograph mechanism allowing the stoppage, the return to zero and the starting of the hand.

It will also be possible to arrange the two concentric wheels at the centre of the movement, the dead-second hand being then directly integral with the wheel 16.

What I claim is:

In a dead-second watch movement including a drive train for the seconds hand, said train including: a toothed driving wheel; a toothed driven wheel coaxial with, and having a greater diameter than, said driving wheel; said wheels having the same number of teeth and forming part of said drive train; a spring connecting said driving and driven wheels; and a double-armed pawl, the first arm of which engages intermittently the teeth of said driven wheel, thereby preventing its continuous rotation, and the second arm of which has an end coinciding with the path of the teeth of said driving wheel, said end being adapted to engage and to be displaced by the teeth of said driving wheel; whereby, after the passage of each tooth of said driving wheel over said end, said second arm falls in the space between said last named tooth and the next following tooth, simultaneously disengaging said first arm from the teeth of the driven wheel and allowing entrainment of the latter by said spring.

FRITZ-ANDRÉ ROBERT-CHARRUE.

REFERENCES CITED

The following references are of record in the file of this patent:

UNITED STATES PATENTS

| Number | Name | Date |
|---|---|---|
| 224,635 | Bonjon | Feb. 18, 1880 |
| 458,745 | Benjamin | Sept. 1, 1891 |

FOREIGN PATENTS

| Number | Country | Date |
|---|---|---|
| 21,489 | Great Britain | of 1902 |
| 30,092 | Switzerland | Feb. 10, 1904 |
| 218,688 | Switzerland | May 1, 1942 |